(12) United States Patent
d'Acierno et al.

(10) Patent No.: US 11,159,395 B2
(45) Date of Patent: Oct. 26, 2021

(54) ESTIMATION OF THE QUALITY OF EXPERIENCE OF A SERVICE FROM THE USER BEHAVIOUR

(71) Applicant: Telecom Italia S.p.A., Milan (IT)

(72) Inventors: Mattia d'Acierno, Naples (IT); Bruno Foresi, Turin (IT); Pia Maria Maccario, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 16/772,307

(22) PCT Filed: Dec. 17, 2018

(86) PCT No.: PCT/EP2018/085171
§ 371 (c)(1),
(2) Date: Jun. 12, 2020

(87) PCT Pub. No.: WO2019/121496
PCT Pub. Date: Jun. 27, 2019

(65) Prior Publication Data
US 2021/0083951 A1    Mar. 18, 2021

(30) Foreign Application Priority Data

Dec. 19, 2017    (IT) .......................... 102017000146554

(51) Int. Cl.
*H04L 12/24*    (2006.01)
*H04L 12/26*    (2006.01)
*H04L 29/06*    (2006.01)

(52) U.S. Cl.
CPC ...... *H04L 41/5067* (2013.01); *H04L 41/0213* (2013.01); *H04L 43/028* (2013.01);
(Continued)

(58) Field of Classification Search
CPC ... H04L 41/5067; H04L 43/028; H04L 43/04; H04L 43/067; H04L 43/08; H04L 43/16; H04L 65/4069; H04L 65/80; H04L 67/22
See application file for complete search history.

(56) References Cited

U.S. PATENT DOCUMENTS 8,874,725 B1 *  10/2014  Ganjam ................. H04L 43/08
                                                      709/224
2010/0269044 A1 *  10/2010  Ivanyi ................ H04L 41/5067
                                                      715/736
(Continued)

FOREIGN PATENT DOCUMENTS

EP          2364540 B1    9/2015
WO     2013/029215 A1    3/2013

OTHER PUBLICATIONS

Wenjing, Li, et al. "Quality of experience evaluation of HTTP video streaming based on user interactive behaviors." The Journal of China Universities of Posts and Telecommunications 24.3 (2017): 24-32. (Year: 2017).*

(Continued)

*Primary Examiner* — Vivek Srivastava
*Assistant Examiner* — William C McBeth
(74) *Attorney, Agent, or Firm* — Banner & Witcoff, Ltd.

(57) ABSTRACT

A method is provided for estimating the quality of experience of a service provided over a communication network from activities performed by a user in the fruition of the service. The method comprises: subdividing a user session of the service into a number of time intervals; determining a number of events indicative of the activities performed by the user during a time interval of the number of time intervals; and on the basis of the events, calculating an index indicative of the quality of experience of the service in the time interval.

20 Claims, 4 Drawing Sheets

(52) U.S. Cl.
CPC .............. *H04L 43/08* (2013.01); *H04L 43/16* (2013.01); *H04L 65/4069* (2013.01); *H04L 65/80* (2013.01)

(56) References Cited

U.S. PATENT DOCUMENTS

| | | | |
|---|---|---|---|
| 2012/0117225 | A1 | 5/2012 | Kordasiewicz et al. |
| 2013/0159498 | A1 | 6/2013 | Funge et al. |
| 2013/0219048 | A1 | 8/2013 | Arvidsson et al. |
| 2013/0268577 | A1* | 10/2013 | Oyman .................. H04L 65/80 709/203 |
| 2015/0052246 | A1 | 2/2015 | Kordasiewicz et al. |
| 2017/0237777 | A1* | 8/2017 | Joch .................. H04L 41/5067 713/152 |
| 2018/0048921 | A1* | 2/2018 | Sood .................. H04L 41/5067 |
| 2018/0191837 | A1* | 7/2018 | Christophe ............. H04L 67/22 |

OTHER PUBLICATIONS

Robitza, Werner. "Towards behavior-oriented quality of experience assessment for online video services." Adjunct Publication of the 2017 ACM International Conference on Interactive Experiences for TV and Online Video. 2017. (Year: 2017).*

Yue, Ting, Hongbo Wang, and Shiduan Cheng. "Learning from users: a data-driven method of QoE evaluation for Internet video." Multimedia Tools and Applications 77.20 (2018) (Year: 2018).*

Jan. 15, 2019—(WO) Written Opinion and Search Report ISA—App PCT/EP2018/085171.

"Inferring the QoE of HTTP Video Streaming from User-viewing Activities", by R. K.P. Mok, et al., W-MUST '11 Proceedings of the first ACM SIGCOMM workshop on Measurements up the stack, pp. 31-36, Toronto, Ontario, Canada, Aug. 19, 2011.

* cited by examiner

ESTIMATION OF THE QUALITY OF EXPERIENCE OF A SERVICE FROM THE USER BEHAVIOUR

TECHNICAL FIELD

The present invention relates to the field of telecommunications. In particular, the present invention relates to a method for estimating the quality of experience of a service (for instance, a video-streaming service) over a communication network, in particular an IP communication network, from the user behaviour in the fruition of the service.

BACKGROUND ART

In the last years, the number of users of digital multimedia services has grown exponentially, thanks to the widespread use of both fixed and mobile devices (smartphone, tablet, PC, smart TV) capable of connecting to an IP (Internet Protocol) communication network. Among the multimedia services, services related to the digital streaming of audio-visual contents are becoming popular to a great number of users. Examples of such services encompass VoIP (Voice over IP) services, VOD (Video On Demand) services, IPTV (IP Television) services, etc.

Moreover, users may exploit different technologies to access the above cited services, such as xDSL (Digital Subscriber Line) technologies: ADSL (Asymmetric Digital Subscriber Line) HDSL (High bit-rate Digital Subscriber Line), VDSL (Very high-bit-rate Digital Subscriber Line), RDSL (Rate-adaptive Digital Subscriber Line), SDLS (Symmetric Digital Subscriber Line), FTTH (Fiber to the Home), in combination with Wi-Fi technologies, and, possibly, over mobile communications networks. Besides, users may use different devices to access the services, even simultaneously.

The digital multimedia service demand is going to increase while pushing the research to, on one end, develop technologies capable of making available a greater bandwidth, and, on the other end, enhance the quality of the digital multimedia service fruition. Indeed, it is a key point, for a service provider, to develop customer retention strategies based on the offering of enhanced quality services. These strategies shall be based on methods and systems capable of measuring the quality of the digital streaming in order to optimize the Quality of Experience (QoE) perceived by a user during the digital streaming fruition.

Methods are known for modelling and measuring the QoE for a digital multimedia service, which may be based on estimating objective parameters related to network parameters such as the available bandwidth, or the packet loss rate, and/or subjective parameters reflecting the user satisfaction.

For instance, US 2013/0159498 A1 discloses techniques for representing a user Quality of Experience (QoE) experienced by users of a streaming media service using a single QoE metric. The single QoE metric may be determined based on a set of empirical characteristics relating to the streaming video service such as startup latency, video quality, and the likelihood of interruptions in streaming playback. The empirical characteristics may be weighted according to how much one factor influences user quality of experience, relative to the others.

Besides, US 2015/0052246 A1 discloses a monitoring device including a video buffer model and a user model. The video buffer model monitors a media program streaming across a network to a media client for perceivable transmission impairments. The user model reflects user dissatisfaction due to types of perceivable transmission impairments and timing, duration, and frequency of perceivable transmission impairments so as to estimate a quality of experience of the media program. The parametric model can include one or more parameterized functions, and a set of parameters used in at least one of the one or more of the parameterized functions at a point in time during the streaming of the media program can be based on a type of perceivable transmission impairment associated with the point in time.

Another approach to QoE modelling relies on analysing the interactions between the user and the application that is providing the digital multimedia service, e.g. the digital video streaming. In other words, it is possible to understand the user satisfaction by analysing the sequence of commands that the user executes in order to interact with the video streaming application (for instance, the Start, Stop, Pause, Refresh, Play commands). The user behaviour is an indication of the user satisfaction and hence it allows estimating the subjective parameters related to the perceived QoE. The estimation of these subjective parameters from the analysis of the user behaviour may be referred to as "behaviour QoE" (or BQoE).

Document "Inferring the QoE of HTTP Video Streaming from User-viewing Activities", by R. K. P. Mok, et al., W-MUST '11 Proceedings of the first ACM SIGCOMM workshop on Measurements up the stack, Pages 31-36, Toronto, Ontario, Canada, Aug. 19, 2011, discloses subjective experiments to analyse user-viewing activities and correlate them with network path performance and user quality of experience.

SUMMARY OF THE INVENTION

The inventors have noticed that document "Inferring the QoE of HTTP Video Streaming from User-viewing Activities" by R. K. P. Mok, et al. discloses an experimental setup according to which user-viewing activities are evaluated in a controlled experimental situation and used to estimate the subjective parameters in the QoE of HTTP video streaming. The user-viewing activities are assumed to be more likely triggered by impairment events, and they are consequently inspected within a range around each impairment event.

Starting from the approach described in the document cited herein above, the Applicant has tackled the problem of providing a method for estimating the behaviour QoE of a service (for instance, a video-streaming service) provided over a communication network, in particular an IP communication network, which allows automatically estimating the QoE of the service on the basis of the activities performed by a real user (namely, not in a controlled experimental situation) in the fruition of the service.

According to a first aspect, the present invention provides a method for estimating the quality of experience of a service provided over a communication network from activities performed by a user in the fruition of the service, the method comprising:
a) subdividing a user session of the service into a number of time intervals;
b) determining a number of events indicative of the activities performed by the user during a time interval, $T_x$, of the number of time intervals; and
c) on the basis of the events, calculating an index, $BT_x$, indicative of the quality of experience of the service in the time interval.

Preferably, the method further comprises, at step b):

b1) subdividing the time interval, $T_x$, into a number of time sub-intervals;

b2) gathering a number of elementary events, each elementary event being indicative of a respective activity performed by the user during a time sub-interval, $t_{i,x}$, of the number of time sub-intervals; and b3) combining the elementary events into a complex event.

Preferably, the method further comprises, at step b3), comparing the complex event with a set of patterns, each pattern being associated with a respective predefined combination of elementary events and with a predefined index, $B_{i,x}$, indicative of the quality of experience associated with the predefined combination of elementary events. Preferably, each of the patterns comprises a predefined reliability level, $R_{i,x}$, associated with the index, $B_{i,x}$, indicative of the quality of experience associated with the predefined combination of elementary events.

Preferably, step b3) further comprises, if the complex event matches a pattern of the set of patterns, associating with the time sub-interval a data triplet comprising a pattern identifier, the predefined index, $B_{i,x}$, and the predefined reliability level, $R_{i,x}$.

Preferably, steps b2) and b3) are repeated for all valid time sub-intervals of the time interval, $T_x$, wherein a valid sub-interval is a sub-interval in which fruition of the service by the user takes place, thereby providing a set of data triplets comprising the pattern identifiers, the predefined indexes and the predefined reliability levels associated with the valid time-sub-intervals.

Preferably, the set of patterns comprises positive patterns and negative patterns, wherein a positive pattern has associated therewith a predefined combination of elementary events indicating that the user is perceiving a good quality, and a negative pattern has associated therewith a predefined combination of elementary events indicating that the user is perceiving a service degradation and tries to remedy, and wherein step c) comprises:

- if the number of data triplets associated with negative patterns is higher than a first threshold, the index, $BT_x$, indicative of the quality of experience of the service in the time interval is equal to a minimum value thereof, and the reliability level is equal to a maximum value thereof;
- if the number of data triplets associated with negative patterns is lower than a second threshold, the index, $BT_x$, indicative of the quality of experience of the service in the time interval is equal to an average value of the indexes associated with the valid sub-intervals; and
- if the number of data triplets associated with negative patterns is comprised between the first threshold and the second threshold, the index, $BT_x$, indicative of the quality of experience of the service in the time interval is determined on the basis of a distance in time, in terms of a number of time sub-intervals, between two valid time sub-intervals associated with negative patterns.

Preferably, the index, $BT_x$, indicative of the quality of experience of the service in the time interval is determined as:

$$BT_x = BT'_x - BT'_x * \frac{1}{d+1}$$

wherein $BT'_x$ is the average value of the indexes associated with the valid sub-intervals and d is the distance in time between two valid time sub-intervals associated with negative patterns.

Preferably, the method further comprises computing a reliability level, $RT_x$, associated with the index, $BT_x$, indicative of the quality of experience of the service in the time interval, wherein the reliability level, $RT_x$, is determined as the average value of a number of reliability levels, $R_{i,x}$, associated with the valid time-sub-intervals.

Preferably, the reliability level, $R_{i,x}$, associated with the valid time-sub-interval, in case the valid time-sub-interval is associated with a positive pattern, is determined as:

$$R_{i,x} = 1 + \frac{1}{e^{-\alpha * d'}}, \text{ where } \alpha \le 1; \text{ or}$$

$$R_{i,x} = 2 + \alpha * d', \text{ where } \alpha > 1,$$

wherein d' is a distance in time between the valid time sub-interval and a preceding time sub-interval associated with a negative pattern.

Preferably, the method further comprises computing a confidence level, $Conf_x$, associated with the index, $BT_x$, indicative of the quality of experience of the service in the time interval, wherein the confidence level is computed as:

$$Conf_x = \frac{RT_x * 100}{\max R}$$

wherein maxR is a maximum value of the reliability level, $RT_x$.

Preferably, the method further comprises computing a global index, BG, indicative of the quality of experience of the service in the session as:

$$BG = \frac{\sum_{j=1}^{N'} BT_j * K_j}{\sum_{j=1}^{N'} Conf_j * K_j} * 100$$

wherein j is an integer number, N' is a n integer number higher or equal than 1, $BT_j$ is the index indicative of the quality of experience of the service in the time interval $T_j$, $Conf_j$ is the confidence level associated with the index, $BT_j$, and $K_j$ is an integer number equal to 1 if the confidence level, $Conf_j$, is greater than a confidence threshold, or equal to 0 if the confidence level, $Conf_j$, is lower than the confidence threshold.

Preferably, the service is a video streaming service.

According to a second aspect, the present invention provides a computer program product loadable in the memory of a computer and including software code portions for performing the steps of the method as set forth above, when the product is run on the computer.

According to a third aspect, the present invention provides a communication system for estimating the quality of experience of a service provided over a communication network from activities performed by a user for the fruition of the service, wherein a session of fruition of the service by the user is subdivided into a number of time intervals, the system comprising a processing unit comprising:

an elementary event gathering module configured to, determine a number of events indicative of the activities performed by the user during a time interval, $T_x$, of the number of time intervals; and a complex event processing module configured to, on the basis of the events, calculate an index, $BT_x$, indicative of the quality of experience of the service in the time interval.

Preferably, the system further comprises a database configured to store:

a pre-determined value of a length of the time interval $T_x$; and a pre-determined set of target elementary events associated with the fruition of the service, each elementary event being associated with a respective activity of the user for the fruition of the service.

Preferably, the processing unit is configured to detect network events over the communication network, and the elementary event gathering module is further configured to filter the network events and identify the number of events indicative of the activities performed by the user during a time interval, $T_x$, for the fruition of the service on the basis of the set of target elementary events stored in the database.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
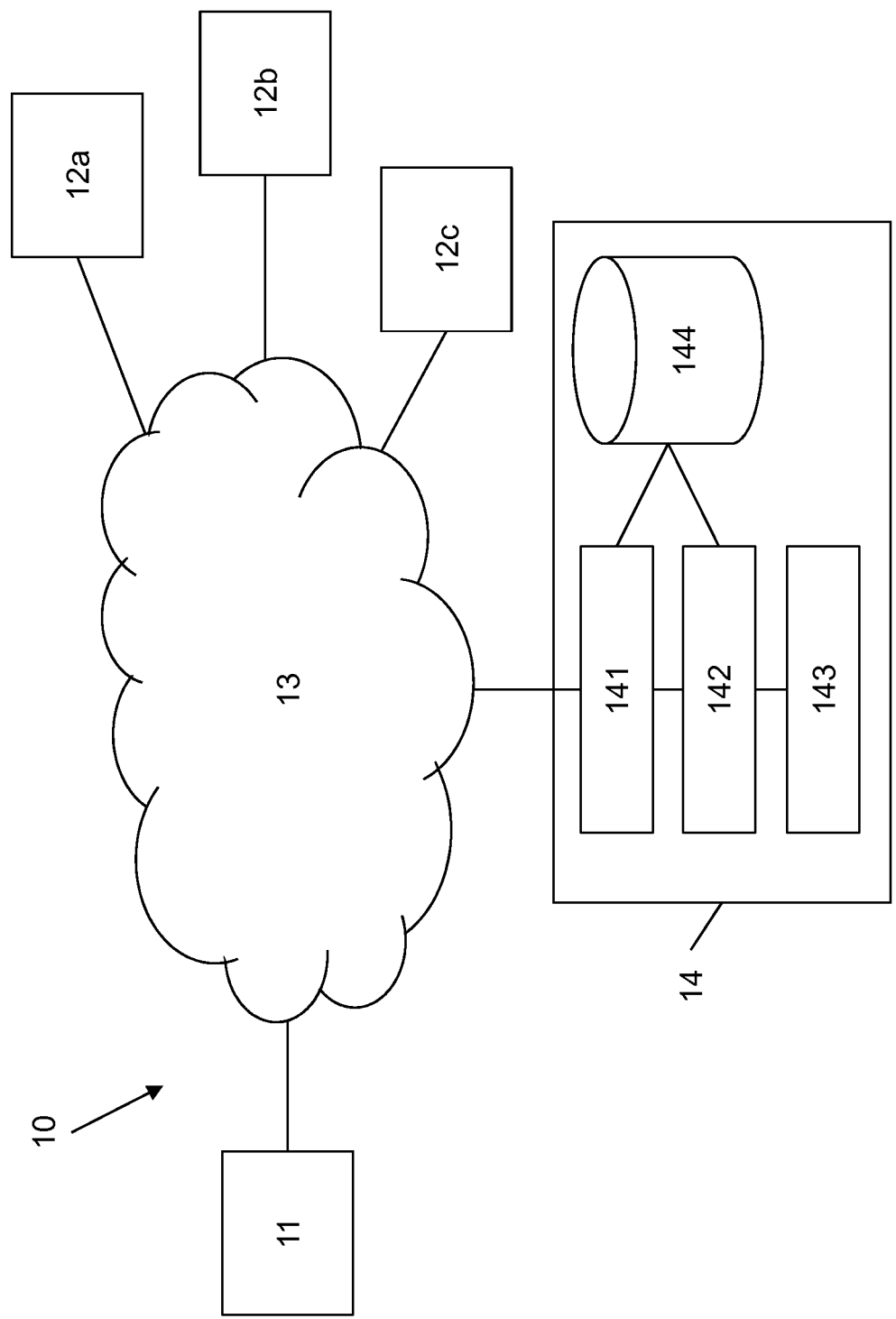
FIG. 1 schematically shows a system in which the present invention may be implemented.

FIG. 1 schematically shows a communication system 10 suitable to implement the method according to the present invention. In the communication system 10 of FIG. 1 a service provider 11 provides multimedia contents to a number of user devices through a communication network 13, such as an IP communication network (e.g. the Internet). The communication network 13 may be either a fixed communication network or a mobile communication network. In FIG. 1, three user devices 12a, 12b, 12c are schematically shown for sake of example. Multimedia contents are provided to users in the form of packet data streams and may comprise audio and/or video contents such as for instance, music, movies, VoIP calls, video calls, IPTV, VOD and the like. User devices may include phones, smartphones, tablets, notebooks, personal computers, smart TVs, portable media players and the like. For sake of non-limiting example, in the following description reference will be made to a video streaming service provided by the service provider 11 to the users though the communication network 13, which the users may enjoy by means of their user devices 12a, 12b, 12c. This example is not limiting since the skilled person will appreciate that the method that will be described herein after may be applied also to other services.

Table 1 herein below illustrates a set of actions (or, equivalently, commands) that may be performed by a user for the fruition of the video streaming service. The first column contains the actions available to the user, the second column contains the explicit meaning of the related command and the third column contains a possible implicit meaning of the related command, as evaluated by the inventors. The possible implicit meaning of an action is indicative of the quality perceived by the user.

TABLE 1

| Actions | Explicit meaning | Implicit meaning |
| --- | --- | --- |
| Start/Play | Start the fruition of the video streaming | The user decides to watch the video |
| Refresh | Reload a page and video | The video streaming is not working or it is unacceptable |
| Pause | Stop playing the video streaming | More time is needed for buffering video data |
| Play Normal Size Screen | Switch from full to normal size screen; watch with a smaller size screen. | The impairments are annoying. |
| Play Full Size Screen | Watch the video with a larger size | The playback is enjoyable |
| Rewind | Replay the content before the current video position. | Replay the buffered video can result in a smoother streaming. |
| Forward | Watch the content after the current video position. | The video content is not interesting or the users are trying to reload the video |
| SwitchUp | Switch to a higher video quality; watch the video with a better picture quality. | Try to watch the video streaming with a better quality (es. SD/HD) |
| SwitchUpUp | Switch two levels of higher video quality; watch the video with a better picture quality. | Try to watch the video streaming with a better quality (es. LD/HD) |
| SwitchDown | Switch to a lower video quality; watch the video with a lower picture quality. | Reduce the resolution for the video streaming smoothness (es. SD/LD) |
| SwitchDownDown | Switch two levels of lower video quality; watch the video with a lower picture quality. | Reduce the resolution for the video streaming smoothness (es. HD/LD) |
| Stop | End the fruition of the video streaming | The user decides to end video watching |

The commands defined above may be described with reference to the state diagram of FIG. 2. In this diagram, an arrow represents the execution of a command and an oval object represents a possible corresponding status (IDLE, PLAY, OFF, PAUSE, SEARCH) of the user device during the fruition of the service. A "fruition session", or simply "session", of a user for the given video streaming service is represented by the sequence of actions performed by the user starting from a Play command, enabling the video streaming to start up to a Stop command, which makes the video playback to end. As seen in the state diagram of FIG. 2, a fruition session is the sequence of states starting from an IDLE state, which is left by executing the first Play command, up to an OFF state, to which a user arrives with the execution of the Stop command.

Figure 2:
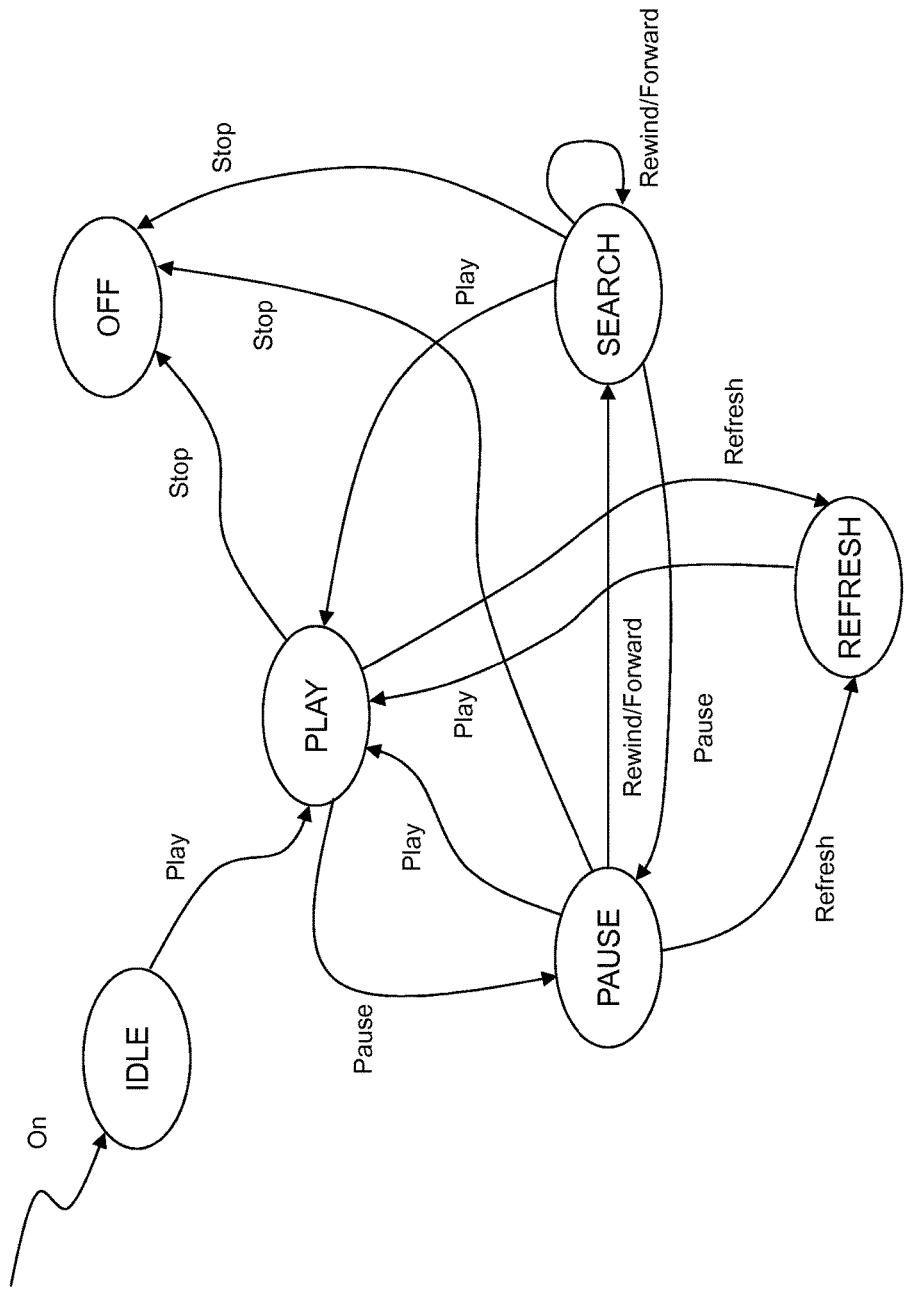
FIG. 2 shows a state diagram illustrating a set of commands used in the fruition of a video streaming service, according to an exemplary situation described herein after.

In the state diagram of FIG. 2, sub-state REFRESH corresponds to a Refresh command, which is used to request retransmission of the content data (i.e. an image in the video streaming). Commands Rewind and Forward in the video streaming session are used to, respectively, see again a frame or a sequence of video frames and skip a frame or a sequence of video frames. If they are used repeatedly, they indicate that the user wishes to see an exact point of the video. This condition is represented by the state SEARCH, which is reached after execution of a Rewind or a Forward command and in which the user device stays until the execution of a Play command.

The explicit and implicit meanings of the cited commands will now be better described with reference to Table 1 above. As illustrated in Table 1, a Play command indicates the start of a fruition session: in this case, the Play command makes the user device to switch from the IDLE state to an active state (the PLAY state), as already mentioned above. In other situations, the Play command is used to resume the playback after another command such as a Pause command. A Stop command indicates the end of the session: in this case the Stop command makes the user device to switch from the active state to the OFF state. The Play and Stop commands, when considered individually, are not indicative of the quality perceived by the user and hence they have no implicit meaning.

The command Refresh is used to request retransmission of the content data by the service provider 11, as already mentioned above. The Refresh command indicates, as implicit meaning, a poor quality perceived by the user.

The Pause command is usually used in two situations: when the user needs to stop playing the video streaming or when a poor quality is perceived by the user due to slowdown of the communication network, which affects buffering (i.e. the loading of the video). In particular, the video loading time may be short, and in this case, usually, the user is satisfied, or long, and in this case the user is not satisfied. The Pause command hence may indicate that the user, which is not satisfied by the video loading speed, selects to pause the video streaming in order to allow the video buffering. However, usually, the implicit meaning of the Pause command is better defined by analysing the command that follows it.

The Rewind and Forward commands when performed in sequence and repeatedly have no implicit meaning, per se. However, a Rewind command after a Pause command typically indicates poor quality. Typically, a video may be played with a given quality, which is also related to the video definition and indicated as Standard Definition (SD), High Definition (HD) or Low Definition (LD). While usually a video is playing in SD, the user may request to play the same video in HD or in LD by means of, respectively, the SwitchUp or SwitchDown commands. If a video is played in HD, the user may request to reduce the video quality to SD with the SwitchDown command, or LD, with the SwitchDownDown command. Analogously, if a video is played in LD, the user may request to enhance the video quality to SD, with the SwitchUp command, or HD, with the SwitchUpUp command.

Implicitly, the commands SwitchUp or SwitchUpUp, as used during the video streaming, indicate that the user is perceiving good video quality, while commands SwitchDown or SwitchDownDown indicate that the user is perceiving a poor quality.

The commands Play Normal Size Screen and Play Full Size Screen are commands related to a change in the video dimension (or format) on the screen. The parameters related to the video dimension are indicated as Normal Size Screen and Full Size Screen. Implicitly, the commands related to the change of video dimension indicate, respectively, that the user is perceiving a poor quality or a good quality during the video streaming.

According to the present invention, an "elementary event" of a fruition session is an information element associated with a user activity (namely, a command or an action) performed during the fruition session of the service and comprises:
 an identifier of the user activity (e.g. the command name);
 an identifier of the user device through which the command is executed, such as its IP address;
 an identifier of the fruition session;
 the date and time of the command execution.

Moreover, the following definitions apply to the present description:
 T is the time duration of the fruition session as measured from the Play command starting the session (i.e. the command making the user device to switch from the idle status to the active status) to the Stop command ending the session (i.e. the command making the user device to switch from the active status to the off status);
 the fruition session is subdivided into a number N of time intervals $T_x$, wherein, in the adopted notation, the subscript (in this case, x) is an integer number identifying the time interval within the fruition session according to a sequential numbering (x=1, ..., N), and N is an integer number higher than 1; according to the present invention, each time interval $T_x$ is associated with a BQoE index $BT_x$, namely a behaviour quality of experience index, as it will be described in greater detail herein after. According to the present invention, the BQoE index $BT_x$ indicates the quality of experience associated with commands or actions executed by the user during the time interval $T_x$;
 each time interval $T_x$ is subdivided into a number M of time sub-intervals $t_{i,x}$, wherein, in the adopted notation, the first subscript (in this case, i) is an integer number identifying the time sub-intervals of a same time interval $T_x$, i=1, ..., M, according to a sequential numbering, the time interval being identified by the second subscript (in this case, x), and M is an integer number higher than 1; during each time sub-interval $t_{i,x}$, identification of the elementary events occurring within the time sub-interval $t_{i,x}$ and aggregation of such elementary events into complex events will be carried out as described in greater detail herein below; moreover, the complex events will be matched with predefined patterns so that each complex event is associated with a respective BQoE index $B_{i,x}$ as detailed herein after. According to the present invention, the BQoE index $B_{i,x}$ indicates the quality of experience associated with commands or actions executed by the user during the time sub-interval $t_{i,x}$.

The duration of the time interval $T_x$ will be indicated as $D_p$. Preferably, the time intervals $T_x$ into which the session is subdivided have all the same duration $D_p$, which may be equal to, for instance, a few minutes. As it will be clearer herein after, the last time interval $T_N$ of the session may have a lesser duration. The duration of the time intervals $t_{i,x}$ of a given time interval $T_x$ will be indicated as $d_p$. Preferably, the time sub-intervals $t_{i,x}$ have all the same duration $d_p$, which may be equal to, for instance, a few seconds, and it may be different for each user and for each session. As it will be clearer herein after, the last time sub-interval of the time interval $T_N$ may have a lesser duration.

According to the present invention, a "complex event" is an information element indicating a sequence or a combination of elementary events which occur within a predefined sub-interval of time $t_{i,x}$ of duration $d_p$.

In general, the quality perceived by the user is inherently correlated to the temporal sequence of elementary events. The definition of the complex events allows taking into consideration such sequence of elementary events. An example illustrating the significance of considering complex events is related to the situation in which a user executes, in a very short time, several Refresh commands for refreshing the content data. Only considering the complex event comprising the Refresh commands executed in sequence it is possible to estimate, with a good reliability level, that the user is experiencing problems in the service fruition.

Moreover, according to the present invention, a "pattern" is an information entity which models a sequence or combination of user activities as associated with a predetermined BQoE index. Each pattern preferably comprises:

one or more elementary events that may occur within a time sub-interval $t_{i,x}$;

a BQoE index, $B_{i,x}$, indicating a value of the BQoE associated with the one or more elementary events that may occur within a time sub-interval $t_{i,x}$; and a reliability level, $R_{i,x}$ indicating the reliability of the value indicated by the BQoE index, $B_{i,x}$.

The value of the BQoE index is an integer number ranging between a minimum value minB, e.g. 0, and a maximum value maxB, e.g. 100. The minimum value of the BQoE index is associated with a poor quality as perceived by the user, while the maximum value of the BQoE index is associated with a high quality as perceived by the user.

As known, reliability, in statistics, indicates the overall consistency of a measure or, in other words, it's a measure of the stability or consistency of a score. According to the present invention, the reliability level identifies the "trustiness" by which a given set of user commands represent the associated BQoE index (a higher level of reliability level corresponds to an higher "trustiness"). The reliability level is an integer number ranging between a minimum value minR, e.g. 1, and a maximum value maxR, e.g. 5. The minimum value of the reliability level indicates a poor reliability while the maximum value of the reliability level indicates a high reliability.

In the following description, different examples of patterns will be identified. Patterns may be grouped on the basis of the quality perceived by the user in the fruition of the video streaming service. Each group of patterns that will be presented is associated with a predetermined BQoE index and a reliability level.

The first type of identified patterns comprises patterns indicating that the user is satisfied about the fruition of the service and she/he does not detect any variation in the perceived quality. These patterns comprise three different groups of patterns, each group being indicated by a pattern identifier. The groups of the first type of patterns are identified as OK patterns, PLAY patterns and PAUSE patterns. They are listed in the following Table 2. OK and PLAY patterns will be also referred to, in the following description, as "positive patterns". According to the present invention, a pattern may be identified as a "positive" pattern if it has associated therewith commands or actions indicating that the user is perceiving a good quality.

TABLE 2

| Pattern | Commands | Number of commands | BQoE index | Reliability level |
|---|---|---|---|---|
| OK | — | 0 | 100 | 2 |
| PLAY | Play | 1 | 100 | 2 |
| OK | Pause and Play | 2 | 100 | 2 |
| PAUSE | Pause and Forward | 2 | — | — |
| PAUSE | Pause | 1 | — | — |
| PAUSE | Forward | 1 | — | — |
| PAUSE | Rewind | 1 | — | — |
| PAUSE | Pause and Rewind | 2 | — | — |

The first column comprises the pattern identifier, the second column comprises the pattern commands (0, 1 or more), the third column comprises the corresponding number of commands, the fourth column comprises the predetermined BQoE index associated with the pattern and the fifth column comprises the reliability level. In the table above and in all the subsequent tables, symbol "-" in a cell represents the absence of the corresponding value.

According to the examples above, the OK and PLAY patterns are associated with a BQoE index having the maximum value, for instance, 100, with a reliability level equal to 2.

It has to be noticed that when the user executes the Pause, Forward or Rewind commands (PAUSE patterns), the fruition of the video streaming service is interrupted. Hence, the PAUSE patterns are not associated with any value of the BQoE index and reliability level.

The second type of identified patterns comprises patterns indicating that the user is experiencing some problems in the fruition of the video streaming service. These patterns comprise a group of patterns, which will be indicated as SCATTO patterns, which are listed in the following Table 3.

TABLE 3

| Pattern | Commands | Number of commands | BQoE index | Reliability level |
|---|---|---|---|---|
| SCATTO | Refresh | 1 | 75 | 3 |
| SCATTO | Mix | 3 or more | 75 | 3 |

The SCATTO patterns are related to the execution of a single Refresh command or of a sequence ("Mix") of three or more commands other than Refresh, Play. According to the examples above, the SCATTO patterns are associated with a BQoE index having a value of 75, with a reliability level equal to 3.

The third type of identified patterns comprises patterns indicating that the user is experiencing a poor or very poor quality in the fruition of the video streaming service. These patterns comprise a group of patterns indicated as KO patterns, which are listed in the following Table 4.

TABLE 4

| Pattern | Commands | Number of commands | BQoE index | Reliability level |
|---|---|---|---|---|
| KO | Refresh, Play | 2 | 0 | 4 |
| KO | Refresh, Play | 3 or more | 0 | 5 |

The KO patterns are related to repeated executions of the couple of commands Refresh and Play, from which it may be inferred that the user is experiencing a poor or very poor quality in the fruition of the video streaming service.

The patterns of the second and third types will be referred to, in the following description, also as "negative patterns". According to the present invention, a pattern may be identified as a "negative" pattern if it has associated therewith commands or actions indicating that the user is perceiving a service degradation and tries to remedy.

The fourth type of identified patterns comprises patterns indicating a change in the video format or dimension. Some patterns indicate that the user is experiencing a deterioration of the perceived quality at different levels, and this is indicated by the execution of the commands SwitchDown, SwitchDownDown and Play Normal Size Screen. Other patterns are related to the execution of the commands SwitchUp, SwitchUpUp and Play Full Size Screen, which indicate that the user is perceiving a good quality and she/he assumes that she/he may enjoy a better quality by changing the video format or dimension. These patterns comprise four different groups of patterns, which will be indicated as MINUS patterns, EXTRA MINUS patterns, PLUS patterns and EXTRA PLUS patterns. They are listed in the following Table 5.

TABLE 5

| Pattern | Commands | Number of commands | BQoE index | Reliability level |
|---|---|---|---|---|
| MINUS | SwitchDown (HD to SD) | 1 | — | — |
| MINUS | SwitchDown (SD to LD) | 1 | — | — |
| MINUS | Play Normal Size Screen | 1 | — | — |
| EXTRA MINUS | SwitchDownDown | 1 | — | — |
| PLUS | SwitchUp (SD to HD) | 1 | — | — |
| PLUS | SwitchUp (LD to SD) | 1 | — | — |
| PLUS | Play Full Screen | 1 | — | — |
| EXTRA PLUS | SwitchUpUp | 1 | — | — |

These patterns are not associated with any value of the BQoE index and reliability level, as it will be clearer from the following description.

According to embodiments of the present invention, the patterns are stored in a database, as it will be described herein after.

The communication system of FIG. 1 will be now described in detail. According to the present invention, the communication system 10 comprises a processing unit 14, which in turn comprises an elementary event gathering module 141 (also referred to as EEGM in the Figures), a complex event processing module 142 (also referred to as CEPM in the Figures) and a BQoE calculation module 143, connected in cascade. The processing unit 14 further preferably comprises a database 144 connected to the complex event processing module 142 and to the elementary event gathering module 141. The processing unit 14 may be implemented as a software unit running on a hardware device (such as a server).

The database 144 is preferably pre-configured before operation of the system according to the present invention. In particular, the pre-configured database 144 preferably comprises:

the pre-determined value of the length of the time intervals $T_x$ (e.g. 15 minutes);

the pre-determined value of the length of the time sub-intervals $t_{i,x}$ (e.g. 15 seconds);

a pre-determined set of target elementary events associated with the fruition of the service, each comprising a different command, which are used for the pattern identification by filtering the events occurring at the user device;

an initial set of patterns, comprising, for each pattern, the pre-determined BQoE index $B_{i,x}$, and the reliability level $R_{i,x}$, as defined above.

In operation, the database 144 may preferably store the values of the BQoE indexes and reliability levels associated with different service sessions and/or users. These values may be stored in the form of tables in which the values of the BQoE indexes and reliability levels provided by the present invention are associated with time intervals and sessions for a given predetermined period of time and/or for a given user, and so on.

Initially, the value of the BQoE index $B_{i,x}$ and the reliability level $R_{i,x}$ of a pattern are selected by an expert operator. The initial set of patterns may comprise, for instance, the patterns described above, namely the OK patterns, PLAY patterns, PAUSE patterns, SCATTO patterns, KO patterns, MINUS patterns, EXTRA MINUS patterns, PLUS patterns, and EXTRA PLUS patterns. Then, the patterns stored in the database 144 may be modified, or new patterns may be added during the operation of the system according to the present invention. This may be done on the basis of the observation of the users' behaviour which may be inferred, over time, from the user's commands and actions. In addition, the patterns may be modified on the basis of other QoE indicators, such as a feedback from the user. Other patterns may be added when specific behaviours are observed by the users, or patterns already stored may be adjusted on the basis of specific commands available on the considered user device (for instance, a command to watch a video, which is available only on a smartphone and which is not available on other devices) or associated with a specific service (for instance, a service allowing to share comments among users simultaneously watching the same video).

The processing unit 14 is preferably configured to detect the data traffic within the communication network and perform an analysis thereof, by implementing, for instance, the SNMP (Simple Network management Protocol) protocol. The data traffic over the communication network comprises network events related to the commands or actions executed by the user through its user device. In particular, an SNMP manager may be implemented at the processing unit 14, which may interrogate an SNMP agent installed on the user device and receive trap messages indicating the events triggered by the commands executed on the user device. In particular, the trap messages may indicate each command/action performed by the user though her/his user device in the fruition of the considered service.

The elementary event gathering module 141 is preferably configured to filter the events associated with the user device by using the set of target elementary events stored in the database 144, and to identify the elementary events associated with the commands that the user executes during a service fruition session. In particular, in each time interval $T_x$ of the fruition session, the elementary event gathering module 141 is preferably configured to filter the events on a time sub-interval basis and to gather the identified elementary events associated with the commands that the user executes during each time sub-interval $t_{i,x}$. Moreover, the elementary event gathering module 141 is preferably configured to aggregate the elementary events of each time sub-interval $t_{i,x}$ to provide a corresponding complex event, as defined above. In case a time sub-interval $t_{i,x}$ comprises a single elementary event, the related complex event corresponds to that elementary event. Finally, the elementary event gathering module 141 is preferably configured to forward the complex events of the considered time interval $T_x$ to the complex event processing module 142.

The complex event processing module 142 is preferably configured to receive the complex events provided by the elementary event gathering module 141 and compare each complex event with the patterns stored in the database 144 to identify a specific pattern that may be associated with the complex event, as it will be described in greater detail herein after. The complex event processing module 142 is then preferably configured to return, for each complex event, the value of the BQoE index, $B_{i,x}$, and its reliability level $R_{i,x}$. Moreover, the complex event processing module 142 is preferably configured to collect the values of the BQoE indexes, $B_{i,x}$, and the reliability levels $R_{i,x}$, i=1, . . . , M, x=1, . . . , N, of all the complex events in each time interval $T_x$, and compute the BQoE index $BT_x$, and its reliability level $RT_x$, associated with each time interval $T_x$.

The calculation module 143 is preferably configured to collect the values of the BQoE indexes $BT_x$, and the reliability levels $RT_x$, x=1, . . . , N of each time interval $T_x$, and compute a BQoE index, and a related reliability level, associated with the fruition session, which will be indicated as global BQoE index BG and global reliability level RG.

The value of the BQoE index, and its reliability level, associated with the fruition session may be stored in the database 144, as well as other information related to the calculation of that value, such as the patterns that have been used. These information may be advantageously used to adjust the current set of patterns or to create new patterns.

Figure 3:
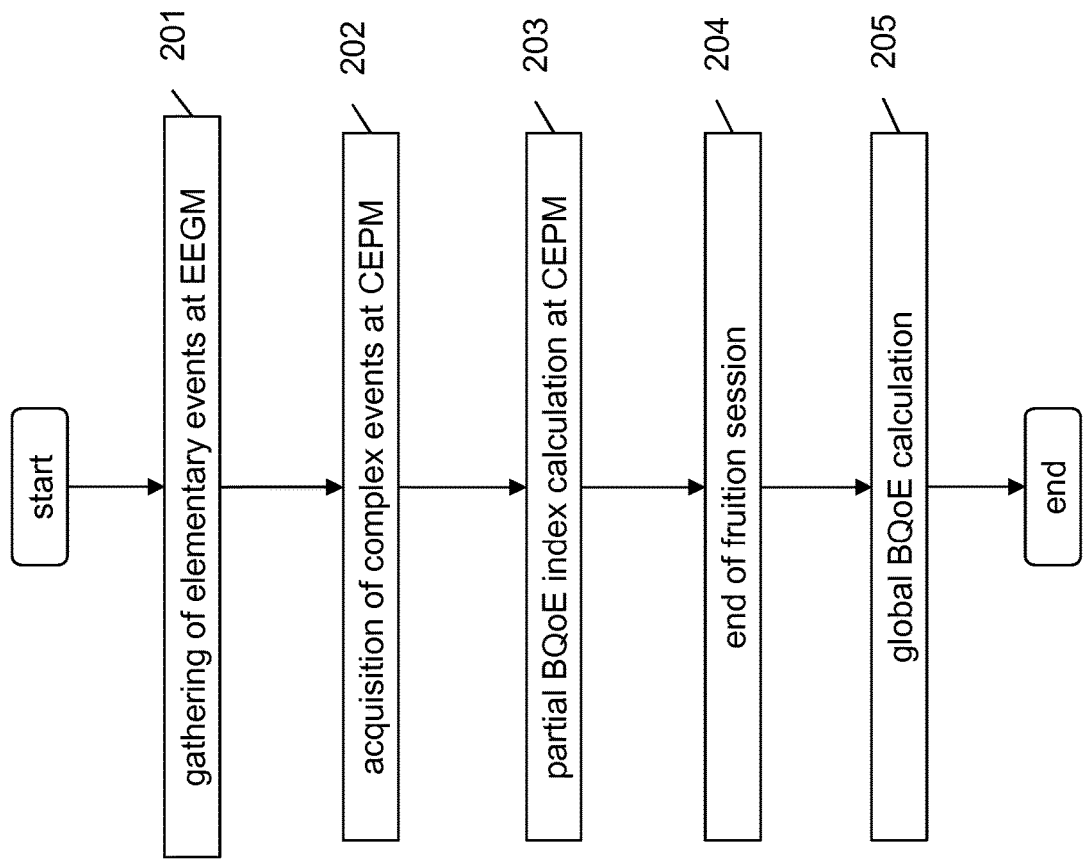
FIG. 3 is a flowchart of the method according to embodiments of the present invention.

FIG. 3 shows a flowchart of the method according to embodiments of the present invention. The method preferably comprises an initial configuration step, not shown in FIG. 3. The initial configuration step comprises pre-configuring the database 144 as described above. In particular, the initial configuration step comprises defining the initial set of patterns and storing them into the database 144. The default values of the video definition and the video dimension at the start a fruition session are Standard Dimension (SD) and Normal Size Screen, respectively.

After a fruition session starts, the elementary event gathering module 141 preferably filters the events occurring on the user device by using the set of target elementary events stored in the database 144, on a time sub-interval basis. In this way, it gathers the elementary events associated with the commands that the user executes for the fruition of the considered service during each time sub-interval $t_{i,x}$ (step 201). Moreover, the elementary event gathering module 141 preferably aggregates the elementary events of each time sub-interval $t_{i,x}$ to provide a corresponding complex event.

The complex events provided by the elementary event gathering module 141 for each time interval $T_x$ are then forwarded to the complex event processing module 142 (step 202). The complex event processing module 142, preferably computes the BQoE index $BT_x$ (together with the related reliability level $RT_x$ and a confidence level, which will be introduced herein after) associated with each time interval $T_x$ into which the fruition session is subdivided (step 203). The computation of the BQoE indexes $BT_x$, x=1, . . . , N, associated with the time intervals $T_x$, x=1, . . . , N into which the fruition session is subdivided is indicated in the flow chart of FIG. 3 as "partial BQoE index calculation" (step 203). When the fruition session ends, (step 204), the BQoE calculation module 143 preferably computes the global BQoE index associated with the entire fruition session (step 205). The global BQoE index is associated with a related reliability level and with a confidence level, as it will be described herein after.

Figure 4:
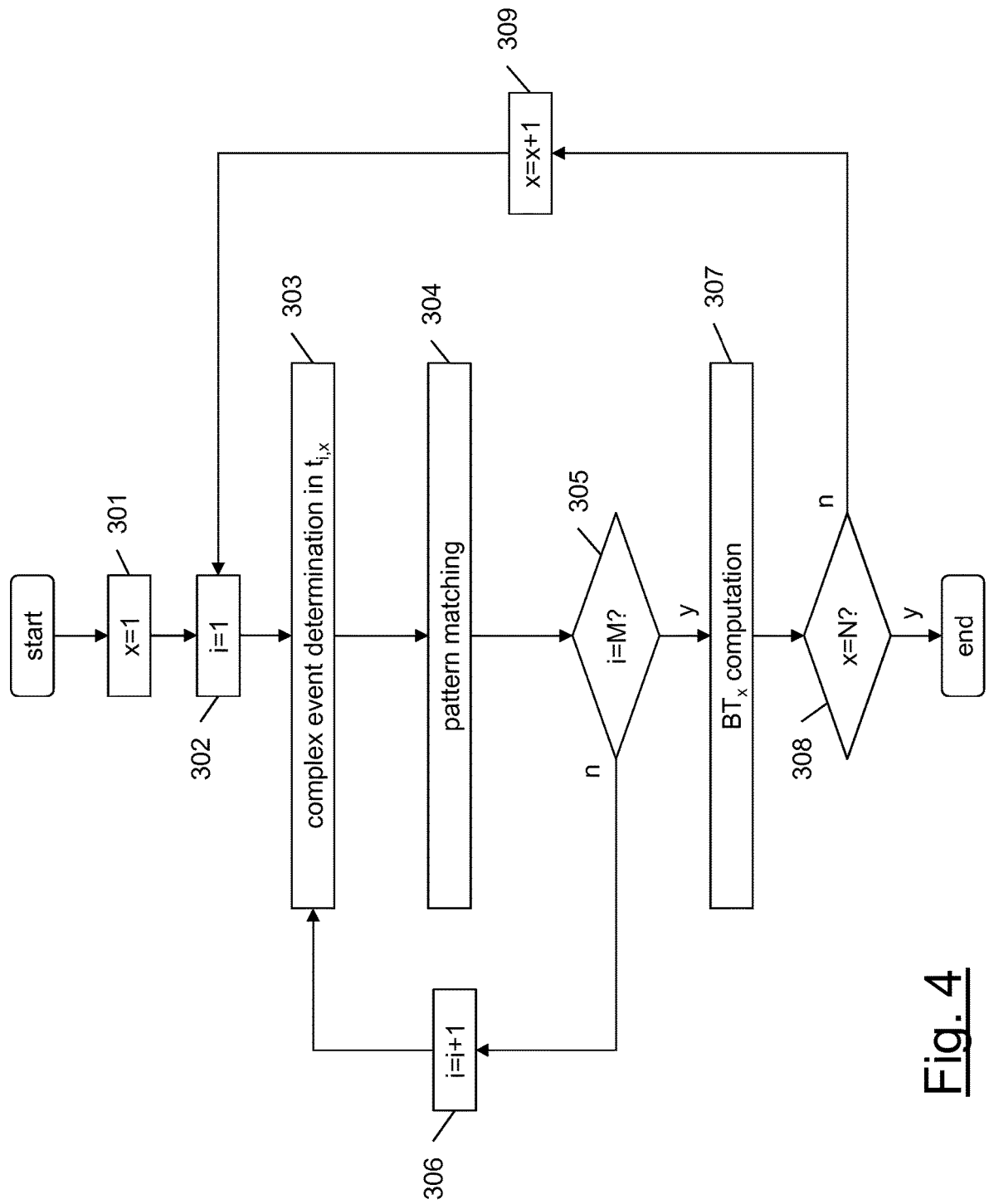
FIG. 4 is another flowchart illustrating in more detail one of the steps of the method according to the present invention.

In the following description, steps 201-203 will be described in detail with reference to the flowchart of FIG. 4.

As already disclosed above, the method of the present invention provides for computing a BQoE index $BT_x$, and a related reliability level $RT_x$, for each time interval $T_x$ of duration $D_p$ into which the fruition session is subdivided. The method starts with determining the BQoE index $BT_1$ in the first time internal $T_1$ (step 301) and proceeds determining the BQoE index $BT_x$ in each time internal $T_x$ (step 306) until the end of the fruition session (wherein, according to the notation used in the flowchart of FIG. 4, x=N at step 308).

Determining the BQoE index $BT_x$ in the generic time internal $T_x$ is preferably performed as follows. For each time sub-interval $t_{i,x}$, i=1, . . . , M, in the generic time interval $T_x$, starting from the first time sub-interval $t_{1,x}$ (step 302), the elementary event gathering module 141 preferably aggregates the elementary events of the time interval $t_{i,x}$ into a complex event (step 303). Then, preferably, the complex event processing module 142 compares the complex event determined at step 303 with the patterns stored in the database 144. At the end of this operation, the complex event processing module 142 preferably matches each complex event with a specific pattern and hence it associates with the complex event a specific BQoE index $B_{i,x}$ and a specific reliability level $R_{i,x}$ (step 304). The time sub-interval $t_{i,x}$ is hence associated with the data triplet:

<PATTERN$_{i,x}$, $B_{i,x}$, $R_{i,x}$> wherein PATTERN$_{i,x}$ is the pattern identifier.

Step 303 and 304 are preferably repeated for each time sub-interval $t_{i,x}$ within the time interval $T_x$.

After all time sub-intervals $t_{i,x}$, i=1, . . . , M, have been considered (steps 305, 306), the BQoE index $BT_x$ associated with the time interval $T_x$ is preferably computed (step 307), as described herein after.

First of all, the data triplets <PATTERN$_{i,x}$, $B_{i,x}$, $R_{i,x}$> of the time sub-intervals $t_{i,x}$ within the time interval $T_x$ are considered sequentially. The data triplets associated with time sub-intervals during which there is no fruition of the service by the user are preferably discarded. In the exemplary situation described above, the data triplets comprised between a PAUSE pattern and a PLAY pattern, in the absence of any command therebetween, are preferably discarded. The remaining data triplets are indicated as "valid data triplets". In the following description, it will be assumed that M' valid triplets are identified (M' being an integer number higher than or equal to 1 and lower than or equal to M), and index i=1, . . . , M' will be used as subscript to indicate the valid data triplets, as well as to indicate the time sub-intervals $t_{i,x}$ associated with such valid data triplets. If no valid data triplets are determined for a given time interval $T_x$, it is assumed that the time interval $T_x$ is not associated with any value of the BQoE index.

Then, preferably, the BQoE index of each time sub-intervals $t_{i,x}$ is preferably adjusted by multiplying the value of the BQoE index by correction factors indicative of the video definition (LD, SD, HD) and the video format (Full Size Screen, Normal Size Screen).

Preferably, a first correction factor $C_1$ is used to indicate the video definition, and a second correction factor $C_2$ is used to indicate the video format. The first correction factor $C_1$ and the second correction factor $C_2$ are expressed as percentage values that may be defined, for instance, as follows:

| Video definition | $C_1$ |
|---|---|
| Standard Definition SD | 90% |
| High Definition HD | 100% |
| Low Definition LD | 60% |
| Video format | $C_2$ |
| Full Size Screen | 100% |
| Normal Size Screen | 90% |

The value of the BQoE index of each time sub-interval is preferably adjusted by multiplying the BQoE index value by the first correction factor $C_1$ and by the second correction factor $C_2$ according to the following equation:

$$BC_{i,x} = B_{i,x} * C_1 * C_2 \quad [1]$$

wherein $BC_{i,x}$ is the adjusted BQoE index.

In practice, the BQoE index associated with each time sub-interval $t_{i,x}$ is preferably adjusted by multiplying the value of the BQoE index by the correction factors associated with the current video definition and video format. These same correction factors are used to adjust the value of the BQoE index also for the subsequent time sub-intervals, until a pattern with a change in the video definition or video format (e.g. associated with any of a MINUS, EXTRA MINUS, PLUS or EXTRA PLUS pattern according to the example above) is detected in the subsequent triplets, which causes the corresponding correction factor to change. Moreover, in this case, the information indicating the current video definition and the video format associated with the fruition session of the considered user, which are maintained in the complex event processing module 142, are preferably updated with the new value of video definition or video format, respectively.

Once the BQoE indexes associated with the time sub-intervals $t_{i,x}$ are adjusted as described above, the complex event processing module 142 preferably counts, among the valid data triplets, the data triplets of the time interval $T_x$ which are associated with negative patterns (indicated also as "negative data triplets"). These triplets are associated with patterns indicating either that the user is experiencing some problems in the fruition of the video streaming service during the considered time interval $t_{i,x}$, or that the user is experiencing a poor or very poor quality in the fruition of the video streaming service during the considered time interval $t_{i,x}$. In the exemplary situation described above, these patterns are the SCATTO patterns and the KO patterns. In the count of the negative data triplets, each triplet having a value of the BQoE index equal to the minimum value minB, e.g. 0, may be equivalent to more than one triplet having a value of the BQoE index higher than the minimum value. For instance, one triplet associated with a KO pattern may count as two triplets associated with the SCATTO patterns.

Moreover, the complex event processing module 142 preferably compares the number of negative data triplets with a first threshold indicating an unacceptable number of negative triplets (e.g. 25% of the total number of valid data triplets), and with a second threshold indicating an acceptable number of negative data triplets (e.g. 6% of the total number of valid data triplets).

In case the number of negative data triplets of the time interval $T_x$ is higher than the first threshold, the BQoE index $BT_x$ of the time interval $T_x$ is preferably set to the minimum value, e.g. 0, and the reliability level $RT_x$ is preferably set to the maximum value, e.g. 5.

In case the number of negative data triplets is lower than the second threshold, the BQoE index $BT_x$ of the time interval $T_x$ is preferably computed as the average value of the BQoE indexes $BC_{i,x}$, x=1, . . . , M' of the time sub-intervals $t_{i,x}$ associated with valid data triplets (as adjusted according to equation [1] above), according to the following equation:

$$BT_x = \frac{\sum_{i=1}^{M'} BC_{i,x}}{M'}. \quad [2]$$

In case the number of negative data triplets of the time interval $T_x$ is comprised between the first threshold and the second threshold, the BQoE computation module 143 preferably applies an algorithm according to which the BQoE index $BT_x$ of the time interval $T_x$ is computed by taking into consideration the distance in time between the complex events associated with the patterns of the negative triplets. Indeed, the user perception about the deterioration of the quality is linked in a non-linear way to the number of "defects" (e.g. image freezing, flickering, audio gaps) and depends on the distance of the time instants at which they occur. For instance, the user perceives a worse deterioration in case she/he executes four Refresh commands within one minute than in case she/he executes them within 15 minutes.

In order to take into account the non-linearity cited above, the algorithm may operate according to the following steps:

a) a first value of the BQoE index $BT'_x$ of the time interval $T_x$ is computed as:

$$BT'_x = \frac{\sum_{i=1}^{M'} BC_{i,x}}{M'}; \quad [3]$$

b) it is assumed that $t_{a,x}$ is the first sub-interval within the time interval $T_x$ that is associated with a negative pattern; it is further assumed that $t_{a+y,x}$ is the first time sub-interval after the time sub-interval $t_{a,x}$ that is associated with another negative pattern (a and y being integer numbers higher than or equal to 1). It is assumed that d is the distance between the two identified time sub-intervals $t_{a,x}$ and $t_{a+y,x}$ in terms of numbers of time sub-intervals. In case no negative patterns occur after the time sub-interval $t_{a,x}$ within the considered time interval $T_x$, the algorithm provides for searching a negative pattern in the subsequent time interval $T_{x+1}$. In case no negative patterns are found in the subsequent time interval $T_{x+1}$, this search is performed in any further subsequent time interval $T_{x+z}$, wherein z=2, . . . , N−x, z being an integer number higher than or equal to 1.

c) The value of the BQoE index $BT_x$ of the time interval $T_x$ is computed according to the following equation:

$$BT_x = BT'_x - f(BT'_x, d) \quad [4]$$

wherein, for instance:

$$f(BT'_x, d) = BT'_x * \frac{1}{d+1}. \quad [5]$$

d) The time sub-intervals after the time sub-interval $t_{a,x}$ are taken into account: in case another negative pattern is found in one of these time sub-intervals, steps b) and c) described above are preferably repeated. In case no other negative patterns are found, the value of the BQoE index $BT_x$ of the time interval $T_x$ is the value obtained at step c) above.

According to alternative embodiments of the present invention, the algorithm applied in case the number of negative data triplets of the time interval $T_x$ is comprised between the first threshold and the second threshold may be the algorithm described in EP 2 364 540 B1 in the name of the Applicant.

According to other embodiments, the algorithm of steps a) to d) above (or, in alternative, the algorithm described in EP 2 364 540 B1) may be applied for computing the BQoE index $BT_x$ of the time interval $T_x$ also in case the number of negative data triplets is lower than the second threshold, when, in particular, the algorithm of steps a) to d) provides a higher value than equation [2].

At step 307, the complex event processing module 142 preferably also computes the reliability level $RT_x$ of the BQoE index $BT_x$.

The inventors noticed that, in order to evaluate the reliability level, it is advantageous to consider how long an observed user behaviour is stable. In particular, it is advantageous to consider how many subsequent occurrences of a positive pattern (namely, the OK pattern) are found within the considered time interval $T_x$. In order to do so, at step 307, the complex event processing module 142 preferably adjusts the value of the reliability level $R_{i,x}$ of the data triplets associated with the OK patterns, which, according to the description above, is equal to 2. In particular, for each time sub-interval $t_{i,x}$ associated with an OK pattern, the complex event processing module 142 preferably determines a distance d', in terms of a number of time sub-intervals, between the considered time sub-interval $t_{i,x}$ and a preceding time sub-interval associated with a negative data triplet (for instance, corresponding to a SCATTO or KO pattern). The reliability level $R_{i,x}$ of the data triplets associated with the OK patterns is then adjusted as follows:

$$R_{i,x} = f(d') \quad [6]$$

wherein f is an increasing function of d', for instance an increasing linear or nonlinear function, having an upper limit depending on the maximum value maxR of the reliability level (which is, e.g., 5). Examples of this function are:

$$R_{i,x} = 1 + \frac{1}{e^{-\alpha * d'}} \quad [6a]$$

where $\alpha1$; or:

$$R_{i,x} = 2 + \alpha * d' \quad [6b]$$

where $\alpha > 1$.

The parameter $\alpha$ may take a value depending on the pre-determined number of sequentially adjacent time sub-intervals associated with a positive data triplet that would be needed for the reliability level to get to the maximum value maxR by discrete increments on a time sub-interval basis. That number may be set to, for instance, 10. According to the exemplary situation described above (maxR=5), the value of the parameter $\alpha$ is chosen so that $R_{i,x}=5$ when d'=10.

In the exemplary case considered in this description, the upper limit of the function f of equation [6] is set to 5. The adjustment described herein above advantageously allows taking into consideration a situation according to which subsequent positive data triplets are identified indicating the user satisfaction over different subsequent time sub-intervals.

The reliability level $RT_x$ of the BQoE index $BT_x$ associated with the time interval $T_x$ is then preferably computed according to the following equation:

$$RT_x = \frac{\sum_{i=1}^{M''} R_{i,x}}{M''} \quad [7]$$

where M" is the number of valid data triplets associated with the time interval $T_x$ having a nonzero reliability level (i.e. the valid data triplets for which $R_{i,x} \neq 0$), M" being an integer number.

Finally, at step 307, the complex event processing module 142 preferably computes a confidence level $Conf_x$ of the BQoE index $BT_x$ associated with the time interval $T_x$. The confidence level is preferably computed according to the following equation:

$$Conf_x = \frac{RT_x * 100}{\max R} \quad [8]$$

wherein maxR is the maximum value of the reliability level as defined above, e.g. 5.

As known, in statistics, a confidence interval (CI) is a range of values that acts as estimate of a population parameter of interest. The confidence level represents the frequency of possible confidence intervals that contain the true value of their corresponding parameter. In other words, if confidence intervals are constructed using a given confidence level in an infinite number of independent experiments, the proportion of those intervals that contain the true value of the parameter will match the confidence level.

According to embodiments of the present invention, steps 302-309 are repeated for each time interval $T_x$ into which the fruition session is subdivided until the Stop command ends the fruition session. Referring back to the flowchart of FIG. 3, at step 205, the global BQoE index BG associated with the fruition session is preferably computed by the BQoE computation module 143. It is assumed that N' is the number of time intervals $T_x$ for which a value of the BQoE index has been computed (indeed, as described above, no value of the BQoE index is computed for time intervals having no valid data triplets associated therewith) as described above, N' being an integer number such that $1 \leq N' \leq N$. The global BQoE index is preferably computed as follows:

if $B_{N'}=0$ (namely, if the BQoE index associated with the last time interval $T_{N'}$ is zero), the global BQoE index is set to zero;

otherwise, the global BQoE index BG is computed according to the following equation:

$$BG = \frac{\sum_{j=1}^{N'} BT_j * K_j}{\sum_{j=1}^{N'} Conf_j * K_j} * 100 \quad [9]$$

wherein subscript j is an integer number and $K_j$ is an integer number that may be equal to 1 if the confidence level associated with the BQoE index of the time interval $T_j$ is greater than a given confidence threshold (which may be equal to, for instance, 50), or 0 if the confidence level associated with the BQoE index $BT_j$ of the time interval $T_j$ is lower than the given confidence threshold.

At step 205, the BQoE computation module 143 also preferably computes a reliability level RG associated with the global BQoE index of the fruition session, according to the following equation:

$$RG = \frac{\sum_{j=1}^{N'} RT_j}{N'} \quad [10]$$

wherein $RT_j$ is the reliability level of the BQoE index $BT_j$.

At step 205, the BQoE computation module 143 finally preferably computes a confidence level ConfG associated with the global BQoE index BG of the fruition session, according to the following equation:

$$ConfG = \frac{\sum_{j=1}^{N'} Conf_j}{N'} \quad [11]$$

wherein $Conf_j$ is the confidence level associated with the time interval $T_j$.

As already mentioned above, the patterns stored in the database 144 during the initial configuration step are pre-determined patterns that may be configured by an expert. Those patterns may be adjusted during operation of the system and/or the database 144 may be populated with new patterns on the basis of, for instance, the observation of the user behaviour over different fruition sessions of the considered service.

As known, generally, the QoE value associated with a fruition session of the considered service may be computed on the basis of different components comprising, for instance, a component derived from a measure of traditional QoS (Quality of Service), which is based on objective network parameters, as already mentioned above, and a component based on subjective parameters such as those that may be inferred by a MOS (Mean Opinion Score) provided by the user of the service, which indicates the quality perceived by the user during or at the end of the fruition session. The global BQoE index estimated as described above may be used as a further component for the computation of the value of the QoE as a function of subjective parameters, as it allows modelling the user behaviour in the fruition of the considered service in near real time.

In the following description, a use case illustrating the method according to the present invention will be presented for sake of example.

According to this use case, a user is enjoying a video streaming service. Commands executable by the user are listed in Table 1. A fruition session has a duration of 15 minutes. The duration of the time intervals $T_x$ is set to 5 minutes, while the duration of the time sub-intervals $t_{i,x}$ is set to 30 seconds. The first threshold indicating an unacceptable number of negative data triplets in the time interval $T_x$ is set to 22%, while the second threshold indicating an acceptable number of negative data triplets in the time interval $T_x$ is set to 6%. It is assumed that the video definition is set to High Definition while the video format is set to Normal Size Screen.

The pre-determined patterns are those described above (PLAY, OK; SCATTO, PAUSE, KO, MINUS, EXTRA MINUS, PLUS, EXTRA PLUS).

It is assumed that during the fruition session, the pattern matching step (step 304 of the flowchart of FIG. 4) in each time sub-interval $t_{i,x}$, as well as application of equation [6] above, provides the results listed in the following Table 6.

TABLE 6

| Time sub-interval | Elementary events | Pattern | Reliability level | BQoE index |
|---|---|---|---|---|
| $t_{1,1}$ | Play | PLAY | 2 | 100 |
| $t_{2,1}$ | Full screen | PLUS | 2 | 100 |
| $t_{3,1}$ | — | OK | 2 | 100 |
| $t_{4,1}$ | Refresh | SCATTO | 3 | 75 |
| $t_{5,1}$ | Refresh | SCATTO | 3 | 75 |
| $t_{6,1}$ | Refresh | SCATTO | 3 | 75 |
| $t_{7,1}$ | Pause | | | |
| $t_{8,1}$ | — | | | |
| $t_{9,1}$ | — | | | |
| $t_{10,1}$ | Play | PLAY | 2 | 100 |
| $t_{1,2}$ | Refresh,Play | KO | 4 | 0 |
| $t_{2,2}$ | — | OK | 2 | 100 |
| $t_{3,2}$ | Switch Down | MINUS | 2 | 100 |
| $t_{4,2}$ | — | OK | 2 | 100 |
| $t_{5,2}$ | — | OK | 2 | 100 |
| $t_{6,2}$ | — | OK | 2 | 100 |
| $t_{7,2}$ | — | OK | 2 | 100 |
| $t_{8,2}$ | — | OK | 2 | 100 |
| $t_{9,2}$ | — | OK | 2 | 100 |
| $t_{10,2}$ | — | OK | 2 | 100 |
| $t_{1,3}$ | — | OK | 2 | 100 |
| $t_{2,3}$ | — | OK | 2 | 100 |
| $t_{3,3}$ | Switch Up | PLUS | 2 | 100 |
| $t_{4,3}$ | — | OK | 2 | 100 |
| $t_{5,3}$ | — | OK | 2 | 100 |
| $t_{6,3}$ | — | OK | 2 | 100 |
| $t_{7,3}$ | — | OK | 2 | 100 |
| $t_{8,3}$ | — | OK | 2 | 100 |
| $t_{9,3}$ | — | OK | 2 | 100 |
| $t_{10,3}$ | Stop | — | — | — |

In the second column of the table above, symbol "-" represents the absence of a command. The third, fourth and fifth columns of the table comprise the data triplets defined according to the present invention as associated with the time sub-intervals $t_{i,x}$. According to the method described above, the data triplets associated with time sub-intervals during which there is no fruition of the service by the user are preferably discarded. In this case, the data triplets comprised between the PAUSE pattern and the PLAY pattern are preferably discarded, namely the data triplets associated with the time sub-intervals $t_{8,1}$ and $t_{9,1}$ in the table above).

Then, the value of the BQoE index of each sub-interval $t_{i,x}$ with a valid data triplet is adjusted by taking into consideration the corrections factors $C_1$ and $C_2$, as illustrated in Table 7 herein below.

TABLE 7

| Time sub-interval | Pattern | Reliability level | BQoE index | $C_1 * C_2$ | Adjusted BQoE index |
|---|---|---|---|---|---|
| $t_{1,1}$ | PLAY | 2 | 100 | 90.0% | 90 |
| $t_{2,1}$ | PLUS | 2 | 100 | 100.0% | 90 |
| $t_{3,1}$ | OK | 2 | 100 | 100.0% | 100 |
| $t_{4,1}$ | SCATTO | 3 | 75 | 100.0% | 75 |
| $t_{5,1}$ | SCATTO | 3 | 75 | 100.0% | 75 |
| $t_{6,1}$ | SCATTO | 3 | 75 | 100.0% | 75 |
| $t_{7,1}$ | PAUSE | — | — | — | — |
| $t_{10,1}$ | PLAY | 2 | 100 | 100.0% | 100 |
| $t_{1,2}$ | KO | 4 | 0 | 100.0% | 0 |
| $t_{2,2}$ | OK | 2 | 100 | 100.0% | 100 |
| $t_{3,2}$ | MINUS | 2 | 100 | 90.0% | 100 |
| $t_{4,2}$ | OK | 2 | 100 | 90.0% | 90 |
| $t_{5,2}$ | OK | 2 | 100 | 90.0% | 90 |
| $t_{6,2}$ | OK | 2 | 100 | 90.0% | 90 |
| $t_{7,2}$ | OK | 2 | 100 | 90.0% | 90 |
| $t_{8,2}$ | OK | 2 | 100 | 90.0% | 90 |
| $t_{9,2}$ | OK | 2 | 100 | 90.0% | 90 |
| $t_{10,2}$ | OK | 2 | 100 | 90.0% | 90 |
| $t_{1,3}$ | OK | 2 | 100 | 90.0% | 90 |
| $t_{2,3}$ | OK | 2 | 100 | 90.0% | 90 |
| $t_{3,3}$ | PLUS | 2 | 100 | 100.0% | 90 |
| $t_{4,3}$ | OK | 2 | 100 | 100.0% | 100 |
| $t_{5,3}$ | OK | 2 | 100 | 100.0% | 100 |
| $t_{6,3}$ | OK | 2 | 100 | 100.0% | 100 |
| $t_{7,3}$ | OK | 2 | 100 | 100.0% | 100 |
| $t_{8,3}$ | OK | 2 | 100 | 100.0% | 100 |
| $t_{9,3}$ | OK | 2 | 100 | 100.0% | 100 |
| $t_{10,3}$ | Stop | | | | |

In the first time interval $T_1$, three negative data triplets are identified (associated with the SCATTO patterns). Their number is higher than the first threshold, and hence $BT_1=0$.

As far as the second time interval $T_2$ is concerned, one negative data triplet is identified, associated with a KO pattern. Hence, in this case, a first value $BT'_2$ of the BQoE index $BT_2$ of the time interval $T_2$ is computed by applying equation [2] as follows:

$$BT'_2 = \frac{\sum_{i=1}^{10} B_{i,2}}{10} = 83$$

and the value $BT_2$ of the BQoE index of the time interval $T_2$ is then computed by applying equations [4] and [5] above, as follows:

$$BT_2 = 83 - 83 * \frac{1}{20} = 78.85$$

where 20 is the distance between the time sub-interval $t_{i,2}$ and the time sub-interval $t_{10,3}$, which is the last interval of the fruition session, as no other time sub-interval either in the second time interval $T_2$ or in the third time interval $T_3$ is associated with a negative data triplet.

As far as the third time interval $T_3$ is concerned, no negative data triplets are identified therein. Hence the BQoE index $BT_3$ is computed as the average value of the BQoE indexes associated with the time sub-intervals $t_{i,3}$, except the last one which comprises the Stop command ending the fruition session. The BQoE index $BT_3$ is computed by applying equation [2] as follows:

$$BT_3 = \frac{\sum_{i=1}^{9} B_{i,3}}{9} = 96.7$$

The reliability levels of the time intervals $T_2$ and $T_3$ are computed as described herein after.

The number of negative data triplets in the first time interval $T_1$ is higher than the first threshold, and hence $RT_1=5$.

In the second time interval $T_2$ as well as in the third time interval $T_3$ adjacent positive data triplets are identified. This means that the value of the reliability level may be adjusted as described above with reference to equation [6].

In particular, a possible outcome of this operation is reported in the following Table 8, where the value of the reliability level is incremented after the third sequentially adjacent time sub-interval associated with a positive data triplet (i.e. $t_{7,2}$) after the Switch Down command at interval $t_{3,2}$, by applying equation [6b] and setting $\alpha=3/10$. A similar result would be obtained by applying equation [6a] and setting $\alpha=0.14$.

TABLE 8

| Time sub-interval | Event | Pattern | Reliability level | Adjusted reliability level |
|---|---|---|---|---|
| $t_{1,2}$ | Refresh, Play | KO | 4 | 4 |
| $t_{2,2}$ | — | OK | 2 | 2 |
| $t_{3,2}$ | Switch Down | MINUS | 2 | 2 |
| $t_{4,2}$ | — | OK | 2 | 2 |
| $t_{5,2}$ | — | OK | 2 | 2 |
| $t_{6,2}$ | — | OK | 2 | 2 |
| $t_{7,2}$ | — | OK | 2 | 2.3 |
| $t_{8,2}$ | — | OK | 2 | 2.6 |
| $t_{9,2}$ | — | OK | 2 | 2.9 |
| $t_{10,2}$ | — | OK | 2 | 3.2 |
| $t_{1,3}$ | — | OK | 2 | 3.5 |
| $t_{2,3}$ | — | OK | 2 | 3.8 |
| $t_{3,3}$ | Switch Up | PLUS | 2 | 4.1 |
| $t_{4,3}$ | — | OK | 2 | 4.4 |
| $t_{5,3}$ | — | OK | 2 | 4.7 |
| $t_{6,3}$ | — | OK | 2 | 5 |
| $t_{7,3}$ | — | OK | 2 | 5 |
| $t_{8,3}$ | — | OK | 2 | 5 |
| $t_{9,3}$ | — | OK | 2 | 5 |
| $t_{10,3}$ | Stop | — | — | — |

As a consequence, the reliability level of the second time interval $T_2$ may be computed as follows:

$$RT_2 = \frac{\sum_{i=1}^{9} R_{i,2}}{10} = 2.5$$

and the reliability level of the third time interval $T_3$ may be computed as follows:

$$RT_3 = \frac{\sum_{i=1}^{9} R_{i,3}}{9} = 4.5$$

The confidence level of the first, second and third time intervals are computed as follows:

$$Conf_1 = \frac{RT_1 * 100}{5} = 100$$

$$Conf_2 = \frac{RT_2 * 100}{5} = 50$$

$$Conf_3 = \frac{RT_3 * 100}{5} = 90.$$

Assuming that the confidence threshold is equal to 50, the global BQoE index associated with the fruition session may be computed according to equation [9] as follows:

$$BG = \frac{\sum_{j=1}^{3} BT_j}{\sum_{j=1}^{3} Conf_j} * 100 = 73,$$

the global reliability level according to equation [10]:

$$RG = \frac{\sum_{j=1}^{3} RT_j}{3} = 4,$$

and the global confidence level according to equation [11]:

$$ConfG = \frac{\sum_{j=1}^{3} Conf_j}{3} = 81.$$

Advantageously, the method according to the present invention allows providing a methodology for estimating the QoE from the actions of a user in the fruition of a service (for instance, a video-streaming service) over a communication network, in particular an IP communication network. The estimation is provided in an automatic manner and may be provided in near real time, allowing to promptly detect certain "defects" in the fruition of the service, or a deterioration of the quality, without waiting for a feedback by the user at the end of the session. Indeed, the feedback from the user may be affected by inaccuracies and may be unreliable, as it may depend on factors that are not related to the quality of the service. The estimation provided by the present invention is, on the contrary, accurate as it is related to the user's actions and not to the user's subjective impression or opinion, and the actions are not considered individually but in combination, which allows recovering the implicit meaning of the identified user's behaviour. Moreover the method allows automatically estimating the QoE from the user's actions and associating to such an estimation a reliability level. From an implementation point of view, the use of the patterns according to the present invention allows filtering the sequence of user's actions within given time intervals and correlating the events occurring over short time intervals to provide an estimation of the quality of experience of the user over longer time periods and over the entire fruition session, together with a reliability level of such an estimation.

The invention claimed is:

1. A method for estimating quality of experience of a service provided over a communication network from activities performed by a user in fruition of said service, the method comprising:
   a) receiving, from an SNMP agent installed on a user device, trap messages indicating elementary events indicative of said activities performed by the user in the fruition of said service during a user session;
   b) subdividing the user session of the service into a number of time intervals;
   c) determining a number of events indicative of said activities performed by the user during a time interval, $T_x$, of said number of time intervals, wherein determining the number of events comprises:
      c1) subdividing said time interval, $T_x$, into a number of time sub-intervals;
      c2) gathering a number of elementary events, each elementary event being indicative of a respective activity performed by the user during a time sub-interval, $t_{i,x}$, of said number of time sub-intervals,
      c3) combining said elementary events into a complex event, and
      c4) comparing said complex event with a set of patterns, each pattern being associated with a respective predefined combination of elementary events and with a predefined index, $B_{i,x}$, indicative of a quality of experience associated with said predefined combination of elementary events;
   d) calculating, based on said events, an index, $BT_x$, indicative of a quality of experience of said service in said time interval; and
   e) detecting, based on the index, $BT_x$, one or more defects in the fruition of said service during the user session.

2. The method according to claim 1, wherein each pattern comprises a predefined reliability level, $R_{i,x}$, associated with said predefined index, $B_{i,x}$, indicative of the quality of experience associated with said predefined combination of elementary events.

3. The method according to claim 2, wherein step c) further comprises;
   c5) if said complex event matches a pattern of said set of patterns, associating with said time sub-interval, $t_{i,x}$, a data triplet comprising a pattern identifier, said predefined index, $B_{i,x}$, and said predefined reliability level, $R_{i,x}$.

4. The method according to claim 3, wherein steps c2) through c5) are repeated for all valid time sub-intervals of said time interval, $T_x$, wherein a valid time sub-interval is a sub-interval in which fruition of said service by said user takes place, thereby providing a set of data triplets comprising the pattern identifiers, the predefined indexes and the predefined reliability levels associated with said valid time sub-intervals.

5. The method according to claim 4, wherein said set of patterns comprises positive patterns and negative patterns, wherein a positive pattern has associated therewith a predefined combination of elementary events indicating that the user is perceiving a good quality, and a negative pattern has associated therewith a predefined combination of elementary events indicating that the user is perceiving a service degradation and tries to remedy, and wherein step d) comprises:
   if a number of data triplets associated with negative patterns is higher than a first threshold, said index, BTx, indicative of the quality of experience of said service in said time interval is equal to a minimum value thereof, and said predefined reliability level, $R_{i,x}$ is equal to a maximum value thereof;

if the number of data triplets associated with negative patterns is lower than a second threshold, said index, BTx, indicative of the quality of experience of said service in said time interval is equal to an average value of said indexes associated with said valid time sub-intervals; and if the number of data triplets associated with negative patterns is comprised between said first threshold and said second threshold, said index, BTx, indicative of the quality of experience of said service in said time interval is determined based on a distance in time, in terms of a number of time sub-intervals, between two valid time sub-intervals associated with negative patterns.

6. The method according to claim 5, wherein said index, $BT_x$, indicative of the quality of experience of said service in said time interval is determined as:

$$BT_x = BT'_x - BT'_x * \frac{1}{d+1}$$

wherein $BT'_x$ is said average value of the predefined indexes associated with said valid time sub-intervals and d is said distance in time between two valid time sub-intervals associated with negative patterns.

7. The method according to claim 4, further comprising computing a reliability level, $RT_x$, associated with said index, $BT_x$, indicative of the quality of experience of said service in said time interval, wherein said reliability level, $RT_x$, is determined as an average value of a number of the predefined reliability levels associated with said valid time sub-intervals.

8. The method according to claim 7, wherein said predefined reliability level, $R_{i,x}$, associated with said valid time sub-interval, in case said valid time sub-interval is associated with a positive pattern, is determined as:

$$R_{i,x} = 1 + \frac{1}{e^{-\alpha*d}}, \text{ where } \alpha \leq 1; \text{ or}$$

$$R_{i,x} = 2 + \alpha * d', \text{ where } \alpha > 1,$$

wherein d' is a distance in time between said valid time sub-interval and a preceding time sub-interval associated with a negative pattern, and wherein α depends on a number of sequentially adjacent time sub-intervals corresponding to a positive pattern.

9. The method according to claim 7, further comprising computing a confidence level, $Conf_x$, associated with said index, $BT_x$, indicative of the quality of experience of said service in said time interval, wherein said confidence level is computed as:

$$Conf_x = \frac{RT_x * 100}{maxR}$$

wherein maxR is a maximum value of said reliability level, $RT_x$.

10. The method according to claim 9, further comprising computing a global index, BG, indicative of the quality of experience of said service in said user session as:

$$BG = \frac{\sum_{j=1}^{N'} BT_j * K_j}{\sum_{j=1}^{N'} Conf_j * K_j} * 100$$

wherein j is an integer number, N' is an integer number great than or equal to 1, $BT_j$ is said index indicative of the quality of experience of said service in a time interval $T_j$, $Conf_j$ is said confidence level associated with said index, $BT_j$, and $K_j$ is an integer number equal to 1 if said confidence level, $Conf_j$, is greater than a confidence threshold, or equal to 0 if said confidence level, $Conf_j$, is lower than said confidence threshold.

11. The method according to claim 1, wherein said service is a video streaming service.

12. A non-transitory computer readable storage medium having software code portions stored thereon that, when executed by a computing device, perform a method for estimating quality of experience of a service provided over a communication network from activities performed by a user in fruition of said service, the method comprising:

a) receiving, from an SNMP agent installed on a user device, trap messages indicating elementary events indicative of said activities performed by the user in the fruition of said service during a user session b) subdividing the user session of the service into a number of time intervals;

c) determining a number of events indicative of said activities performed by the user during a time interval, $T_x$, of said number of time intervals, wherein determining the number of events comprises:

c1) subdividing said time interval, $T_x$, into a number of time sub-intervals;

c2) gathering a number of elementary events, each elementary event being indicative of a respective activity performed by the user during a time sub-interval, $t_{i,x}$, of said number of time sub-intervals, c3) combining said elementary events into a complex event, and c4) comparing said complex event with a set of patterns, each pattern being associated with a respective predefined combination of elementary events and with a predefined index, $B_{i,x}$, indicative of a quality of experience associated with said predefined combination of elementary events;

d) calculating, based on said events, an index, $BT_x$, indicative of a quality of experience of said service in said time interval; and e) detecting, based on the index, $BT_x$, one or more defects in the fruition of said service during the user session.

13. The non-transitory computer readable storage medium of claim 12, wherein each pattern comprises a predefined reliability level, $R_{i,x}$, associated with said predefined index, $B_{i,x}$, indicative of the quality of experience associated with said predefined combination of elementary events.

14. The non-transitory computer readable storage medium of claim 13, wherein step c) further comprises;

c5) if said complex event matches a pattern of said set of patterns, associating with said time sub-interval, $t_{i,x}$, a data triplet comprising a pattern identifier, said predefined index, $B_{i,x}$, and said predefined reliability level, $R_{i,x}$.

15. The non-transitory computer readable storage medium of claim 14, wherein steps c2) through c5) are repeated for all valid time sub-intervals of said time interval, $T_x$, wherein a valid time sub-interval is a sub-interval in which fruition of said service by said user takes place, thereby providing a set of data triplets comprising the pattern identifiers, the predefined indexes and the predefined reliability levels associated with said valid time sub-intervals.

16. The non-transitory computer readable storage medium of claim 15, wherein said set of patterns comprises positive patterns and negative patterns, wherein a positive pattern has associated therewith a predefined combination of elementary events indicating that the user is perceiving a good quality, and a negative pattern has associated therewith a predefined combination of elementary events indicating that the user is perceiving a service degradation and tries to remedy, and wherein step d) comprises:
 if a number of data triplets associated with negative patterns is higher than a first threshold, said index, BTx, indicative of the quality of experience of said service in said time interval is equal to a minimum value thereof, and said predefined reliability level, $R_{i,x}$ is equal to a maximum value thereof;
 if the number of data triplets associated with negative patterns is lower than a second threshold, said index, BTx, indicative of the quality of experience of said service in said time interval is equal to an average value of the predefined indexes associated with said valid time sub-intervals; and
 if the number of data triplets associated with negative patterns is comprised between said first threshold and said second threshold, said index, BTx, indicative of the quality of experience of said service in said time interval is determined based on a distance in time, in terms of a number of time sub-intervals, between two valid time sub-intervals associated with negative patterns.

17. The non-transitory computer readable storage medium of claim 15, wherein the software code portions, when executed by the computing device, further cause the computing device to compute a reliability level, $RT_x$, associated with said index, $BT_x$, indicative of the quality of experience of said service in said time interval, wherein said reliability level, $RT_x$, is determined as an average value of a number of the predefined reliability levels associated with said valid time sub-intervals.

18. A communication system for estimating quality of experience of a service provided over a communication network from activities performed by a user in fruition of said service, wherein a user session of the service is subdivided into a number of time intervals, the communication system comprising:
 a computing device; and
 non-transitory computer readable storage media storing:
  an SNMP manager, that when executed by the computing device, is configured to receive trap messages indicating events indicative of said activities performed by the user in fruition of said service during the user session from an SNMP agent installed on a user device;
  an elementary event gathering module that, when executed by the computing device, is configured to, determine a number of events indicative of said activities performed by the user during a time interval, $T_x$, of said number of time intervals, wherein determining the number of events comprises:
   subdividing said time interval, $T_x$, into a number of time sub-intervals;
   gathering a number of elementary events, each elementary event being indicative of a respective activity performed by the user during a time sub-interval, $t_{i,x}$, of said number of time sub-intervals,
   combining said elementary events into a complex event, and
   comparing said complex event with a set of patterns, each pattern being associated with a respective predefined combination of elementary events and with a predefined index, $B_{i,x}$, indicative of a quality of experience associated with said predefined combination of elementary events; and
  a complex event processing module that, when executed by the computing device, is configured to calculate, based on said events, an index, $BT_x$, indicative of a quality of experience of said service in said time interval,
 wherein the communication system is configured to detect one or more defects in the fruition of said service during the user session and based on the index, $BT_x$.

19. The communication system according to claim 18, further comprising a database configured to store:
 a pre-determined value of a length of said time interval $T_x$; and
 a pre-determined set of target elementary events associated with said fruition of the service, each elementary event being associated with a respective activity of the user for the fruition of the service.

20. The communication system according to claim 19, wherein said non-transitory computer readable storage media further stores instructions, that when executed by the computing device detect network events over said communication network, and
 wherein said elementary event gathering module is further configured to, when executed by the computing device, filter said network events and identify said number of events indicative of said activities performed by the user during the time interval, $T_x$, for the fruition of the service based on said pre-determined set of target elementary events stored in said database.

* * * * *